(12) United States Patent
Lee

(10) Patent No.: US 9,494,737 B2
(45) Date of Patent: Nov. 15, 2016

(54) OPTICAL WAVEGUIDE AND METHOD FOR MANUFACTURING SAME

(71) Applicant: HON HAI PRECISION INDUSTRY CO., LTD., New Taipei (TW)

(72) Inventor: Bing-Heng Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 372 days.

(21) Appl. No.: 14/265,344

(22) Filed: Apr. 29, 2014

(65) Prior Publication Data

US 2014/0321806 A1    Oct. 30, 2014

(30) Foreign Application Priority Data

Apr. 30, 2013    (TW) .............................. 102115558 A

(51) Int. Cl.
*G02B 6/122*    (2006.01)
*G02B 6/12*    (2006.01)

(52) U.S. Cl.
CPC ....... *G02B 6/122* (2013.01); *G02B 2006/1204* (2013.01); *G02B 2006/1218* (2013.01); *G02B 2006/12097* (2013.01); *G02B 2006/12176* (2013.01); *G02B 2006/12183* (2013.01); *G02B 2006/12188* (2013.01)

(58) Field of Classification Search
CPC ............................................. G02B 2006/12097
See application file for complete search history.

(56) References Cited

U.S. PATENT DOCUMENTS

| | | | | |
|---|---|---|---|---|
| 5,572,616 A  * | 11/1996 | Aoki | ......................... | G02B 6/10 385/131 |
| 2001/0022885 A1* | 9/2001 | Yamada | .................... | H01S 5/22 385/131 |
| 2002/0191934 A1* | 12/2002 | Kato | ...................... | G02B 6/122 385/129 |
| 2004/0234223 A1* | 11/2004 | Logvin | .................. | G02B 6/126 385/129 |
| 2005/0271327 A1* | 12/2005 | Burie | ................. | G02B 6/12004 385/43 |

* cited by examiner

*Primary Examiner* — Jerry Rahll
(74) *Attorney, Agent, or Firm* — Zhigang Ma

(57) ABSTRACT

In a method, a substrate is provided and is implanted with argon ions to form an argon ion modified layer. Two slots are defined and extend through the argon ion modified layer to form a ridge. The substrate is etched to change the ridge into a beveled ridge. An etching rate of the argon ion modified layer is higher than that of the substrate. The beveled ridge is diffused with metal to form a beveled ridge waveguide.

15 Claims, 11 Drawing Sheets

OPTICAL WAVEGUIDE AND METHOD FOR MANUFACTURING SAME

FIELD

The present disclosure relates to optical waveguides and, particularly, to a method for manufacturing an optical waveguide having a beveled ridge waveguide and the optical waveguide.

BACKGROUND

Optical waveguides may be formed within substrates and transmit light waves. The light waves are kept in the optical waveguide by total internal reflection at interfaces between the optical waveguide and the substrate. The total internal reflection is caused mainly by a refractive index difference between the optical waveguide and the substrate. The refractive index difference between the optical waveguide and the substrate is often less than satisfactory and, thus, a part of the light wave may leak out of the optical waveguide, increasing insertion loss of the optical waveguide. Ridge-type optical waveguides (i.e., ridge waveguides) have three sides interfaced with the air and a refractive index difference between the optical waveguide and the air is often larger than satisfactory. Therefore, leakage of the light waves from the ridge waveguide can be reduced.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the present disclosure will be described with reference to the drawings.

A method for manufacturing an optical waveguide 100 (see FIG. 11), according to an embodiment, includes the following steps S1-S12.

Figure 1:
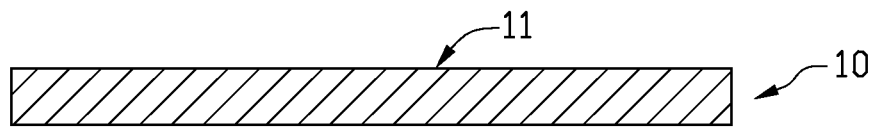
FIGS. 1-11 are cross-sectional views showing how to manufacture an optical waveguide having a ridge waveguide, according to an embodiment.

In step S1, as shown in FIG. 1, a substrate 10 is provided. In this embodiment, the substrate 10 is substantially rectangular and includes a top surface 11. FIG. 1 shows a cross-section of the substrate 10 made by cutting the substrate 10 at right angles to a lengthwise direction of the substrate 10. The substrate 10 can be made of lithium niobate crystal which has a quick response speed and of which a refractive index gradually changes when a medium is loaded thereon. However, in other embodiments, the substrate 10 can be made of other suitable materials.

Figure 2:
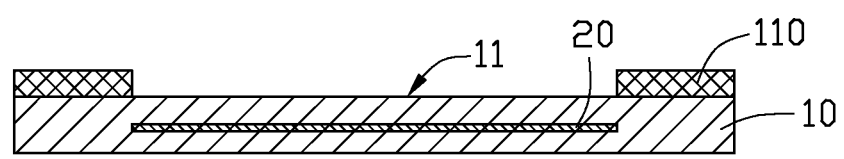

In step S2, as shown in FIG. 2, argon ions are implanted into the substrate 10 via the top surface 11 to form an argon ion modified layer 20 within the substrate 10. The argon ion modified layer 20 is substantially rectangular and extends through lengthwise ends of the substrate 10 along a direction that is substantially parallel with the top surface 11. An orthogonal projection of the argon ion modified layer 20 onto the top surface 11 is positioned across a width at a central part of the top surface 11.

In more detail, a protective layer 110 can be first formed across the width along two opposite edges of the top surface 11 but is exposed across the length of central part of the top surface 11 which is substantially identical to the orthogonal projection of the argon ion modified layer 20 on the top surface 11. The protective layer 110 can protect the substrate 10 from being implanted with the argon ions.

Then, the argon ions are accelerated by a ring accelerator to be implanted into the substrate 10 across the length of the central part of the top surface 11 which is not covered by the protective layer 110. As a result, lattice structures are broken by the argon ions and can form the argon ion modified layer 20. A depth of the argon ion modified layer 20 from the top surface 11 can be controlled by adjusting a power of the ring accelerator and an accelerating time of the argon ions. In this embodiment, a distance between the top surface 11 and the argon ion modified layer 20 is less than about 30 microns.

Figure 3:
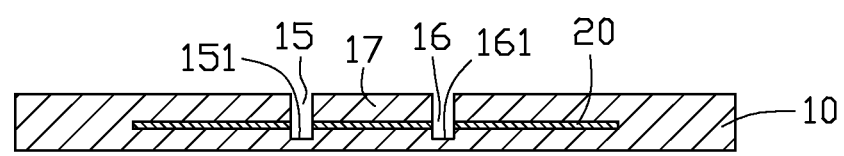
Figure 4:
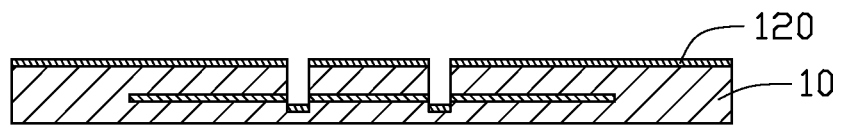

In step S3, as shown in FIG. 3, the protective layer 110 is removed. In addition, as shown in FIG. 4, a first slot 15 and a second slot 16 are defined in the top surface 11 by, for example, cutting. The first slot 15 and the second slot 16 extend in a direction parallel with each other through the length of the ends of the substrate 10 along the length of the direction of the substrate 10, and can extend in parallel with each other through the argon ion modified layer 20 along a height of the substrate 10, leaving a ridge 17 between the first slot 15 and the second slot 16.

The first slot 15 and the second slot 16 are substantially identical to each other in shape and size. The first slot 15 has a first bottom 151. The second slot 16 has a second bottom 161. In this embodiment, a distance between the top surface 11 and the first bottom 151 or the second bottom 161 is about 30 microns.

In step S4, the substrate 10 is cleaned by washing.

In step S5, as shown in FIG. 4, an etch resistance layer 120 is deposited on the top surface 11, the first bottom 151, and the second bottom 161 by, for example, sputtering. In this embodiment, the etch resistance layer 120 is made of chrome.

Figure 5:
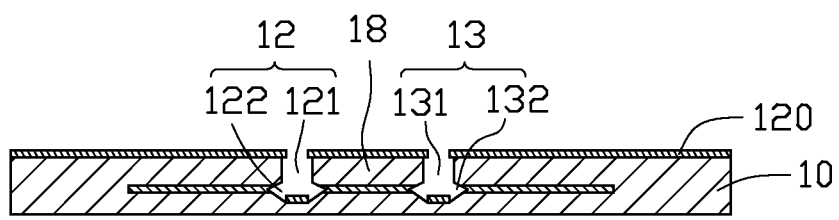

In step S6, as shown in FIG. 5, the substrate 10 is etched by a first etching solution to form a beveled ridge 18. In this embodiment, as the substrate 10 is lithium niobate and the etch resistance layer 120 is made of chrome; the first etching solution can be hydrofluoric acid. However, the first etching solution is not limited to this embodiment but can be changed depending on need.

As the lattice structures of the argon ion modified layer 20 are broken, an etching rate of the argon ion modified layer 20 can be higher than an etching rate of the substrate 10. As such, the first slot 15 can be etched into a first groove 12 including a substantially rectangular section 121 and a substantially rhombic section 122 communicating with each other. The rhombic section 122 has a larger width as compared with the rectangular section 121 and is connected with the argon ion modified layer 20. The rhombic section 122 is substantially symmetrical about the argon ion modified layer 20.

The second slot 16 is etched into a second groove 13 which includes a substantially rectangular section 131 and a substantially rhombic section 132. The substantially rectangular section 131 and the substantially rhombic section 132 are substantially identical with the rectangular section 121 and the rhombic section 132 in shape and size.

Figure 6:
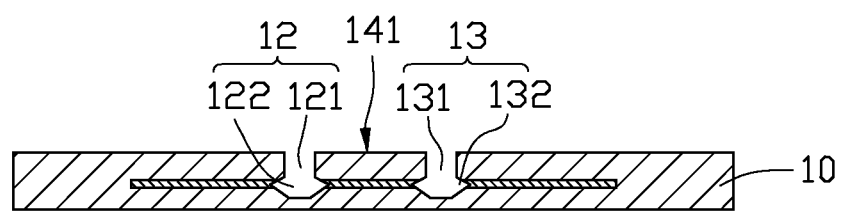

In step S7, as shown in FIG. 6, the etching resistance layer 120 is removed to expose an upper surface 141 of the beveled ridge 18. In detail, the substrate 10 with the etching resistance layer 120 is immersed into a second etching solution. In this embodiment, the second etching solution can contain nitrate to etch the chrome.

Figure 7:
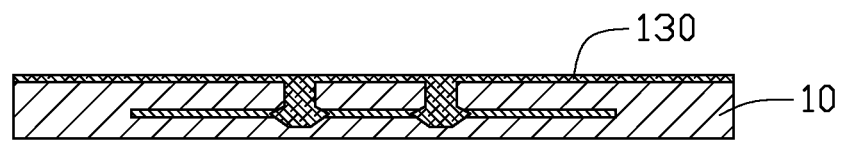

In step S8, as shown in FIG. 7, a photo etching layer 130 is applied to fill the first groove 12 and the second groove 13 and to cover the top surface 11 and the upper surface 141. In this embodiment, the photo etching layer 130 is applied by spin coating. A spin speed of the spin coating is larger than about 6000 revolutions per minute.

Figure 8:
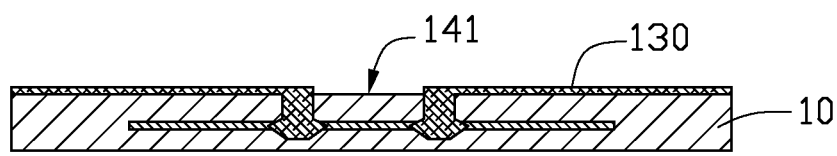

In step S9, as shown in FIG. 8, a part of the photo etching layer 130 covering the upper surface 141 is removed by, for example, a lithography technology.

Figure 9:
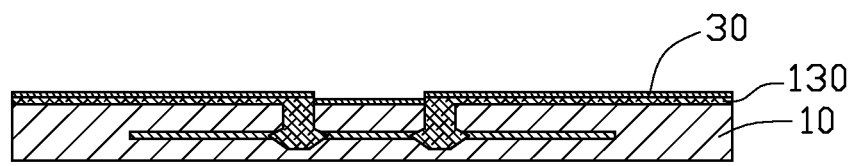

In step S10, as shown in FIG. 9, a metal layer 30, such as a titanium layer, is deposited on the photo etching layer 130 and the upper surface 141, by physical or chemical vapor deposition technologies.

Figure 10:
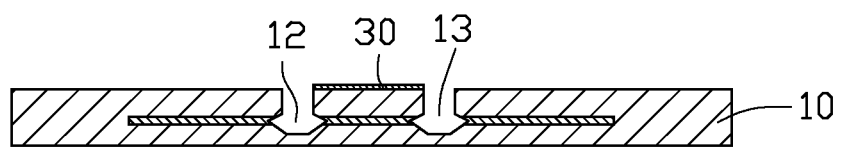

In step S11, as shown in FIG. 10, the photo etching layer 130 is removed. As such, a part of the metal layer 30 covering the photo etching layer 130 is also removed.

Figure 11:
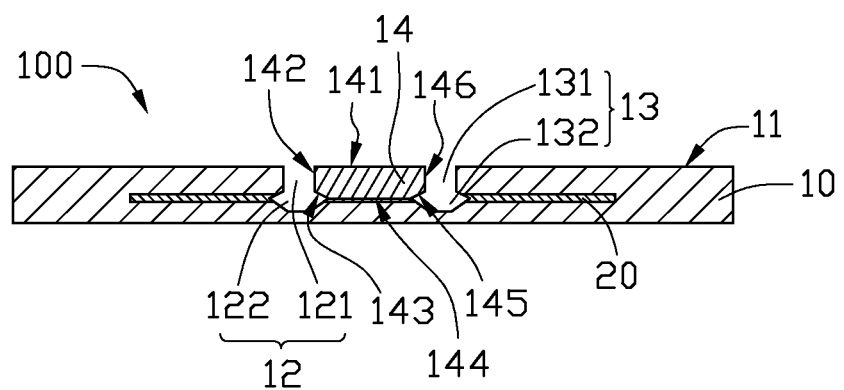

In step S12, as shown in FIG. 11, the substrate 10 and the metal layer 30 are subjected to a high temperature diffusion process to diffuse the metal layer 30 into the beveled ridge 18 to form a ridge waveguide 14.

In addition to the upper surface 141, the ridge waveguide 14 includes two side surfaces 142, 146 connected with the upper surface 141, two beveled surfaces 143, 145 respectively coupled with the side surface 142, 146, and a bottom surface 144 coupled between the beveled surfaces 143, 145 and the argon ion modified layer 20. As such, an interface between the ridge waveguide 14 and the air is increased.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A method for manufacturing an optical waveguide, the method comprising:
   providing a substrate;
   implanting argon ions into the substrate via a top surface of the substrate to form an argon ion modified layer in the substrate;
   defining two slots extending through the argon ion modified layer to form a ridge between the two slots;
   depositing an etching resistance layer on the top surface and bottoms of the slots;
   etching the substrate using a first etching solution, each slot etched into a groove comprising a substantially rhombic section connected with and substantially symmetrical about the argon ion modified layer, the ridge being shaped as a beveled ridge;
   removing the etching resistance layer;
   applying a photo etching layer to fill the grooves and to cover the top surface and an upper surface of the beveled ridge;
   removing a part of the photo etching layer covering the upper surface;
   depositing a metal layer on the photo etching layer and the upper surface;
   removing the photo etching layer; and
   diffusing the metal layer left on the upper surface into the beveled ridge to form a beveled ridge waveguide.

2. The method of claim 1, wherein the substrate is made of lithium niobate.

3. The method of claim 1, wherein the substrate is rectangular, the argon ion modified layer extends through lengthwise ends of the substrate along a direction that is substantially parallel with the top surface, and an orthogonal projection of the argon ion modified layer onto the top surface is positioned across a width at a central part of the top surface.

4. The method of claim 3, wherein the step of implanting argon ions comprises:
   forming a protective layer across the width along two opposite edges of the top surface but being exposed across the length of central part of the top surface which is substantially identical to the orthogonal projection of the argon ion modified layer on the top surface;
   accelerating the argon ions; and
   removing the protective layer.

5. The method of claim 3, wherein the slots extend in a direction parallel with each other through the length of the ends of the substrate along the length of the direction of the substrate, and extend in parallel with each other through the argon ion modified layer along a height of the substrate, leaving the ridge between the slots, and each slot comprises a bottom.

6. The method of claim 5, wherein a distance between the top surface and the argon ion modified layer is less than about 30 microns, and a distance between the top surface and the bottoms is about 30 microns.

7. The method of claim 1, further comprising a step of cleaning the substrate between the step of defining the slots and the step of depositing the etching resistance layer.

8. The method of claim 7, wherein the etching resistance layer is made of chrome.

9. The method of claim 1, wherein the first solution comprises hydrofluoric acid.

10. The method of claim 1, wherein the etching resistance layer is removed by immersing the substrate into a second solution.

11. The method of claim 1, wherein the second solution comprises nitrate.

12. The method of claim 1, wherein the photo etching layer is applied by spin coating.

13. The method of claim 12, wherein a spin speed of the spin coating is larger than about 6000 revolutions per minute.

14. The method of claim 1, wherein the part of the photo etching layer covering the upper surface is removed by lithography.

15. An optical waveguide, comprising:
   a substrate comprising a top surface;
   an argon ion modified layer formed within the substrate;
   two grooves defined in the top surface and extending through the argon ion modified layer, each groove comprising a substantially rhombic section that is connected with and substantially symmetrical about the argon ion modified layer; and
   a beveled ridge waveguide formed between the grooves, and comprising an upper surface coplanar with the top surface, two side surfaces connected with the upper surface, two beveled surfaces connected with the side surfaces, and a bottom surface connected between the beveled surfaces.

* * * * *